United States Patent [19]

Middlebrook

[11] Patent Number: 4,489,187

[45] Date of Patent: Dec. 18, 1984

[54] HEAT-RESISTANT BLENDS OF POLYPROPYLENE, CONJUGATED DIENE/MONOVINYLARENE RUBBERY BLOCK COPOLYMERS, WITH AN IN-SITU CURED POLYCHLOROPRENE

[75] Inventor: Terence C. Middlebrook, Bartlesville, Okla.

[73] Assignee: Phillips Petroleum Company, Bartlesville, Okla.

[21] Appl. No.: 584,674

[22] Filed: Feb. 29, 1984

[51] Int. Cl.$^3$ .................................................. C08K 5/39
[52] U.S. Cl. ................................. 524/201; 524/432; 524/436; 525/96
[58] Field of Search .................. 525/96; 524/201, 432, 524/436

[56] References Cited

U.S. PATENT DOCUMENTS

| | | | |
|---|---|---|---|
| 3,294,868 | 12/1966 | Pritchard | 525/98 |
| 3,417,044 | 12/1968 | Ross et al. | 524/526 |
| 3,860,542 | 1/1974 | Sakaguchi et al. | 524/399 |
| 3,935,329 | 1/1976 | Reilly et al. | 427/35 |
| 3,965,055 | 6/1976 | Shichman et al. | 525/176 |
| 4,005,054 | 1/1977 | Bennefon et al. | 524/521 |
| 4,096,204 | 6/1978 | Gergen | 525/96 |
| 4,107,130 | 8/1978 | Gergen et al. | 523/522 |
| 4,111,894 | 9/1978 | Gergen et al. | 524/505 |
| 4,177,184 | 12/1979 | Condon | 524/232 |
| 4,197,377 | 4/1980 | Bohm et al. | 525/99 |
| 4,248,758 | 2/1981 | Wright | 524/426 |
| 4,258,145 | 3/1981 | Wright | 525/99 |

*Primary Examiner*—Jacob Ziegler
*Attorney, Agent, or Firm*—Lyell H. Carver

[57] ABSTRACT

The loss in tensile of a polypropylene blend with a conjugated diene/monovinylarene rubbery block copolymer can be prevented by including in the blend an effective amount of a polychloroprene, followed by curing the composition with a curative which cures substantially only the polychloroprene component.

20 Claims, No Drawings

HEAT-RESISTANT BLENDS OF POLYPROPYLENE, CONJUGATED DIENE/MONOVINYLARENE RUBBERY BLOCK COPOLYMERS, WITH AN IN-SITU CURED POLYCHLOROPRENE

FIELD OF THE INVENTION

The invention pertains to heat-resistant blends of polypropylene with rubbery conjugated diene/monovinylarene block copolymers. In another aspect, the invention pertains to methods to improve the heat aging characteristics of rubber modified polypropylene blends. In a related aspect, the invention pertains to improving the heat aging characteristics of impact polypropylene rubber blends. In a further aspect, the invention pertains to blends of polypropylene, rubbery block copolymer, and in situ cure polychloroprene.

BACKGROUND OF THE INVENTION

Polypropylene resins are produced in tremendous amounts for various purposes. Polypropylenes are particularly useful as molding resins having low density, high hardness, chemical inertness. Polypropylene by itself has inadequate impact strength for many purposes, unless blended with other materials, or unless specially made polypropylene block copolymers are prepared.

However, the low temperature impact strength of polypropylene can be improved by blending with polymers of various types. Some of the blends have been successful in improving impact strength at low temperature, but have had undesirable side effects. For example, blending polypropylene with polyisobutylene as a modifier improves impact strength, but decreases flexural modulus.

An improved approach blends polypropylene with a rubbery block copolymer of a conjugated diene/monovinylarene character, such as a butadiene/styrene block copolymer. This improves low temperature impact strength of the polypropylene, but at the same time minimizing decreases in flexural modulus.

Remaining has been a problem of loss in tensile of the polypropylene/rubber blend after high temperature aging. Efforts have been made to alleviate this problem in the polypropylene/conjugated diene monovinylarene blends by employing a further component such as an EPDM terpolymer such as described in U.S. Pat. No. 4,258,145 to Wright.

However, the basic need for improvement or avoidance in loss in tensile of the basic blend after high temperature aging still requires a solution.

BRIEF DESCRIPTION OF THE INVENTION

I have found that the loss in tensile of a polypropylene blend with a conjugated diene/monovinylarene rubbery block copolymer can be prevented by including in the blend an effective amount of a polychloroprene, followed by curing the composition with a curative which cures substantially only the polychloroprene component. Without the polychloroprene component, or with only an uncured polychloroprene, the composition loses most of its tensile strength after 300° F. aging.

It is an object of my invention to provide impact polypropylenes capable of exhibiting stability at high temperature aging. It is another object of my invention to provide a polypropylene/rubbery block copolymer blend which avoids loss in tensile at high temperature aging. Other objects of my invention will become apparent to one skilled in the art from a reading of my disclosure and claims.

POLYPROPYLENE

Any of the normally solid substantially polymers of propylene (polypropylene) can be employed. The term "polypropylene" is intended to include normally solid polypropylene homopolymers which are substantially crystalline, isotactic, or syndiotactic in form, and copolymers of propylene having a comonomer content of copolymerized ethylene, butene, or other 1-olefin ($\alpha$-olefin) up to such as about 5 mol percent.

Preferred are the normally solid substantially crystalline polypropylenes having a nominal melt flow in the range of about 1 to 20, presently preferably about 8 to 14, as determined by ASTM D-1238-73 Condition L.

The polypropylenes employed can be utilized in any convenient form such as pellets from a finishing extruder, or as a fluff as obtained from a polymerization recovery step.

CONJUGATED DIENE/MONOVINYLARENE BLOCK COPOLYMERS

The conjugated diene-monovinylarene copolymers for use in the invention are those linear or branched teleblock copolymer elastomeric materials possessing thermoplastic characteristics, i.e., they have high green tensile strength and can be molded into useful rubber objects without vulcanization. The copolymers, frequently termed teleblock copolymers, can be represented by the general formulae A-B-A or $(AB-)_nY$, in which A represents a block of polymerized monovinylarene monomer which can contain minor amounts of copolymerized conjugated diene; B represents a block of polymerized conjugated diene units or alternatively a random or random tapered block copolymer of conjugated diene and monovinylarene monomers; Y is the residual unit from a polyfunctional coupling agent or a polyfunctional initiating species, and n has a value of such as 2 to 6. The A-B-A polymers have a linear structure produced by sequential polymerization of the A segment (monovinylarene) followed by the B segment (conjugated diene, or random or random-tapered conjugated diene-monovinylarene), followed by the other A segment. The polymers represented by $(AB-)_nY$ can be prepared using a polyfunctional initiator. Alternatively, they can be prepared using an initiator such as n-butyllithium by first initiating the polymerization of a monovinylarene monomer, followed by polymerization of the conjugated diene monomer, and then adding a coupling agent having two or more coupling sites to give a linear or radial polymer. Such techniques are disclosed, for example, in U.S. Pat. Nos. 3,251,905, 3,281,383 and 3,639,521, the disclosures of which are hereby incorporated by reference.

When Y is a residue of a polyfunctional coupling agent, it is derived from treating agents containing such as 2 to 6 functional groups per molecule. Useful polyfunctional coupling agents include multiepoxides, multiimines, multiisocyanates, multialdehydes, multiketones, multiesters, multianhydrides and multihalides. Specific examples of such agents include benzene-1,4-diisocyanate, naphthalene-1,2,5,7-tetraisocyanate, tri(1-aziridinyl)phosphine oxide, epoxidized soybean oil, epoxodized linseed oil, 1,4,7-naphthalene tricarboxyaldehyde, 1,4,9,10-anthracenetetrone, pyromellitic dianhydride, trimethyl tricarballylate, dichlorodimethylsilane and silicon tetrachloride.

When Y is a residue of a polyfunctional initiator, it is derived from compounds of general formula $R(Li)_x$ where x is an integer of from 2 to 6 and R is an aliphatic, cycloaliphatic or aromatic radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane and 1,2,3,5-tetralithiocyclohexane.

While a distinction has been made herein between A-B-A polymers made by sequential monomer addition and $(AB-)_nY$ polymers, which would be linear when n is 2 and radial when n is greater than 2, the art sometimes makes no such distinction since the physical properties are generally essentially identical for both A-B-A and $(AB-)_2Y$ polymers.

The copolymers used in the invention composition are referred to as "teleblock" rubbers because each branch of the polymer molecule has the same type of terminal block. As defined above, the teleblock copolymers used in the invention have at least two terminal resinous blocks and a central rubbery block.

Conjugated dienes useful in the preparation of the linear and branched teleblock copolymers are generally those containing 4 to 12 carbon atoms per molecule, preferably those containing 4 to 8 carbon atoms per molecule. Examples of these conjugated dienes include 1,3-butadiene, isoprene, 2,3-dimethyl-1,3-butadiene, piperylene, 3-butyl-1,3-octadiene, 2-phenyl-1,3-butadiene, and mixtures. Especially preferred, because of its availability and low cost, is 1,3-butadiene.

The monovinylarene monomers used in the preparation of the teleblock copolymers are generally those containing 8 to 20, more usually 8 to 12, carbon atoms per molecule. Examples of those monovinylarene monomers include styrene (preferred), α-methylstyrene, p-vinyltoluene, p-t-butylstyrene, and mixtures.

The most useful rubbery block copolymers are the teleblock copolymers generally contain about 50 to 90, preferably about 55 to 80, weight percent copolymerized conjugated diene with the balance being copolymerized monovinylarene. Weight average molecular weights of the rubbery block copolymers for use in the invention are generally are in the range of about 50,000 to 750,000, preferably in the range of about 75,000 to 300,000, as determined from gel permeation chromatography curves and intrinsic viscosities by a method described in G. Kraus and C. J. Stacy, *J. Poly. Sci.* A-2, 10, 657 (1972) and G. Kraus and C. J. Stacy, *J. Poly. Sci. Symposium No.* 43, 329 (1973).

POLYCHLOROPRENES

The neoprene rubbers employed are elastomers based on polymers of chloroprene (2-chloro-1,3-butadiene). The suitable polychloroprenes include any normally solid rubbery polychloroprenes. These may be homopolymers of chloroprene, or can contain various amounts of a copolymeric component such as styrene, isoprene, acrylonitrile, in which the major component of the produced copolymer is chloroprene. Presently preferred are those polychloroprenes with a Mooney viscosity ML4 (212° F.) of about 35 to 65 (ASTM D-1646-63) for reasons of availability and ease in handling.

MIXING PROCEDURE

The selectively cured blend compositions of this invention can be prepared by use of internal mixers such as the Banbury type mixers or by use of mixing extruders such as the Farrel type. The order of mixing is not particularly critical though it is usually convenient to add the polychloroprene curatives and other minor components after the polymers are blended. It is also feasible to preblend the polychloroprene curatives and the polychloroprene prior to blending with the other polymer components. In a less preferred mode, the polychloroprene could be subjected to a precuring step with said curatives prior to blending with the other polymer components. The precured polychloroprene is more difficult to blend the other polymer components than the uncured version, and does not result in as intimately uniform a product as does the in situ cured product wherein substantially only the neoprene component is cured. Mixing conditions are those normally employed in processing the thermoplastics such as polypropylene and the conjugated diene-monovinylarene block copolymers.

BLEND COMPOSITION

The three polymeric components are employed in the blend in accordance with my invention in ranges suitable and effective to produce the desired prevention of loss in tensile of the basic two component blend at high temperature aging. Presently suggested for guidance of those skilled in the art are broad ranges and presently preferred ranges:

| Component | Wt. %, Based on Total Wt. of Polymers | |
| --- | --- | --- |
| | Broad Range | Preferred Range |
| Polypropylene | about 20–60 | about 30–50 |
| Conjugated Diene/Monovinylarene Rubbery Block Copolymer | about 20–60 | about 30–50 |
| Polychloroprene | about 10–30 | about 15–25 |

The above weight percent amounts are based on the amounts of the three components, exclusive of any other additives such as fillers, colorants, anti-oxidants, reinforcing agents, and the like.

POLYCHLOROPRENE CURATIVES

In accordance with my invention, any curative system can be employed which will cure the polychloroprene component without affecting curing, cross-linking, or vulcanization of the polypropylene, or the unsaturated rubbery block polymer, either or both.

It is known that polychloroprenes can be cured with a simple combination of magnesium oxide and zinc oxide optionally with various organic accelerators such as N,N'-dibutylthiourea, 2-mercaptoimidazoline, diphenyl guanidine and the like. These curatives can be employed in this invention in amounts that are usually employed (based on the polychloroprene content).

The polychloroprene component can undergo curing by subjecting the blend containing the proper curatives to temperatures in the range of about 350° to 400° F. for times of about 5 minutes to 30 minutes. Temperatures above 400° F. can be detrimental to the conjugated diene/monovinylarene rubbery block copolymer component of the blend.

OTHER COMPONENTS

The blend compositions of this invention can also contain pigments, flame retardants, fillers, UV stabilizers, processing oils (preferably naphthenic type), and age resistors in minor amounts.

The compositions provided by this invention are characterized by processability (moldability), ozone resistance, high stiffness, and especially heat resistance in terms of retaining tensile strength after aging at temperatures of about 150° C.

The compositions of this invention can be used for sterilizable tubing and containers, electrical insulation on wiring, automotive conduits (under the hood), and splash panels and the like in automobiles. The automotive applications are especially desirable because my polymer compositions are able to withstand the heating that accompanies painting or coating and subsequent drying on the automotive assembly line.

EXAMPLE

Comparative runs shown below are intended to assist one skilled in the art to a further understanding of my invention, yet without intending to limit my invention to particular species, amounts, or the like.

EXAMPLE I

Polymer blends were prepared according to the recipe shown in Table I:

TABLE I

| Ingredient: | M (Control) | E (Control) | J (Invention) |
|---|---|---|---|
| Butadiene/Styrene Block Copolymer[a] | 50 | 40 | 40 |
| Polypropylene[b] | 50 | 40 | 40 |
| Butyl Zimate[c] | 0.5 | 0.5 | 0.5 |
| Weston 618[d] | 0.5 | 0.5 | 0.5 |
| Polychloroprene[e] | 0 | 20 | 20 |
| Zinc Oxide[f] | 0 | 0 | 5 |
| Maglite D[g] | 0 | 0 | 4 |

[a] A butadiene/styrene (70/30 wt. ratio) radial teleblock copolymer of about 300,000 molecular weight having about 30% by wt. block polystyrene obtained from Phillips Petroleum Company.
[b] A commercial polypropylene (homopolymer) having a nominal melt flow of 12 according to the procedure of ASTM D-1238-73, Condition L obtained from Phillips Petroleum Co. in the form of "fluff".
[c] Zinc dibutyldithiocarbamate from R. T. Vanderbilt Co.
[d] Distearyl pentaerythritol diphosphite from Borg Warner Chemicals.
[e] Neoprene GNA from E. I. duPont Co., a general purpose polychloroprene of 37–61 Mooney viscosity (ML-4 212° F.).
[f] Rubber grade material.
[g] Magnesium oxide from C. P. Hall Company.

Butyl Zimate and Weston 618 are employed in the compositions as stabilizers. Zinc oxide and Maglite D are neoprene curatives known in the art.

Each composition was mixed in a Midget Banbury internal mixer by charging all of the ingredients initially and mixing for 5–7 minutes to a dump temperature of 182°–188° C. (360°–370° F.) which would insure that all of the polymer components were "molten" and adequately mixed with all the ingredients. Each mix was dumped on a roll mill and sheeted off for preparation of samples for testing various properties of the compositions. Except for test 1 (melt flow), test specimens were prepared from compression molded slabs which had been obtained by heating for 10 minutes at 360° F. under about 15,000–20,000 psi. Results of the tests are shown in Table II:

TABLE II

| | Composition | | |
|---|---|---|---|
| | M (Control) | E (Control) | J (Invention) |
| 1 Melt Flow[a], g/10 min. (@ 190° C. 21.6 Kg weight) | 66 | 21 | 10 |
| 2 Tensile[b], MPa | 16.0 | 11.0 | 13.0 |
| 3 Elongation[b], % | 110 | <100 | 120 |
| 4 70° C. Tensile[c], MPa | 9.3 | 6.8 | 8.4 |
| 5 70° C. Elongation[c], % | <100 | <100 | 100 |
| 6 Ozone Resistance Rating[d], | 0/0/0 | 0/0/0 | 0/0/0 (1 day) |
| Bent Loop, 5/4/3 inches | 0/0/0 | 0/0/0 | 0/0/0 (7 days) |
| 7 Hardness, Shore D[e] | 62 | 55 | 58 |
| 8 Swelling[f], % after 7 days @ 25° C. in: | | | |
| ASTM Oil #2 | 6.4 | 6.8 | 6.6 |
| ASTM Fuel A | 38.0 | 40.2 | 36.4 |
| Crisco Oil | 3.6 | 5.2 | 4.3 |
| 9 Ross Flex[g], K flexes to: | | | |
| 100% crack growth | 0.1 | 0.03 | 0.2 |
| 500% crack growth | 0.8 | 0.1 | 0.7 |
| 10 Heat Distortion[h], % @: | | | |
| 100° C. | 1.4 | 0 | 0 |
| 125° C. | 1.4 | 0 | 1.3 |
| Aged 7 Days @ 300° F. | | | |
| 11 Tensile[i], MPa | 2.2 | 3.2 | 11.4 |
| 12 Elongation[i], % | <100 | <100 | <100 |

[a] D-1238-73.
[b] D-412-66.
[c] As in ASTM D-412-66 but run at 70° C. on the Scott Tensile Machine, Model L-8.
[d] Sample strips were 0.5 inches wide. Strips were mounted in racks where they were lightly stressed as bent loops and exposed to air containing 50 ± 5 parts per million ozone in an Orec 0300 ozone test chamber at 40° C. Cracking is rated on a scale of 9 to 10 with 0 being none.
[e] ASTM D-2240-68, Shore Durometer Type D.
[f] ASTM D-471-75.
[h] Change in thickness of a 38.1 × 19.1 × 1.8 ± 0.3 mm specimen as measured by a standard micrometer (9.5 mm diameter foot, 85 g load) heated at test temperature for at least 1 hour.
[i] As in ASTM D-412-66 but after aging the sample as indicated.

Comparison of the melt flow results for control Composition E and inventive Composition J indicate that curing of the neoprene component in inventive Composition J took place during the Banbury mixing step. It also is likely that additional curing of the neoprene in inventive Composition J occurred during the compression molding step.

The results in Table II demonstrate that control Composition M which does not contain a polychloroprene component has a reasonably good balance of properties including ozone resistance and tensile strength at room temperature and at 70° C. However, aging at 300° F. for 7 days drastically reduces the tensile strength.

Control Composition E contains a polychloroprene component but no curatives therefor. Compound E also shows a reasonably good balance of properties but again shows a drastic reduction in tensile strength after aging at 300° F. for 7 days.

Inventive Composition J contains a polychloroprene component and curatives therefor. Compound J shows a reasonably good balance of properties as in M and E but surprisingly shows only a slight loss in tensile strength after aging at 300° F. for 7 days. This result indicates that articles made from Composition J would be much more heat resistant than articles made from Composition E or M in terms of maintaining physical strength properties after exposure to elevated temperatures.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A polymer blend comprising effective ratios to maintain stability at high temperature aging of a polypropylene, a conjugated diene/monovinylarene rubbery block copolymer, a polychloroprene, and a curative effective to cure substantially only the polychloroprene component.

2. The polymer blend according to claim 1 wherein said polypropylene has a nominal melt flow in the range of about 1 to 20.

3. The polymer blend according to claim 2 wherein said polychloroprene has a Mooney viscosity in the range of about 35 to 65 ML-4.

4. The polymer blend according to claim 3 containing about 20 to 60 weight percent polypropylene, about 20 to 60 weight percent conjugated diene/monovinylarene rubbery block copolymer, and about 10 to 30 weight percent polychloroprene, exclusive of other additives.

5. The polymer blend according to claim 4 wherein said conjugated diene/monovinylarene rubbery block copolymer is characterized by a structure represented by A-B-A or (AB-)$_n$Y wherein A represents a block of polymerized monovinylarene monomer, B a block of polymerized conjugated diene monomer, and Y a residual unit of a polyfunctional coupling agent or polyfunctional initiator, and n is an integer of 2 to 6 inclusive.

6. The polymer blend according to claim 5 wherein said conjugated diene contains 4 to 8 carbon atoms per molecule, and said monovinylarene contains 8 to 12 carbon atoms per molecule.

7. The polymer blend according to claim 6 containing about 30 to 50 weight percent substantially crystalline polypropylene, about 30 to 50 weight percent rubbery block copolymer, and about 75 to 25 weight percent polychloroprene, based on weights of polymers.

8. The polymer blend according to claim 7 wherein said conjugated diene is butadiene, and said monovinylarene is styrene.

9. The composition according to claim 8 employing a 70/30 butadiene/styrene rubbery block copolymer, a polypropylene having a nominal melt flow of about 12, a polychloroprene having an ML-4 of about 37-61, and a polychloroprene curing system comprising zinc dibutyldithiocarbamate, zinc oxide, and magnesium oxide.

10. A cured polymer blend comprising effective ratios to maintain stability at high temperature aging of polypropylene, a conjugated diene/monovinylarene rubbery block copolymer, and polychloroprene, cured with a curative system effective to substantially cure in situ only said polychloroprene.

11. The cured polymer blend according to claim 10 wherein said polypropylene has a nominal melt flow in the range of about 4 to 20.

12. The cured polymer blend according to claim 11 wherein said neoprene has a Mooney viscosity in the range of about 35 to 65 ML-4.

13. The cured polymer blend according to claim 12 containing about 20 to 60 weight percent polypropylene, about 20 to 60 weight percent conjugated diene/monovinylarene rubbery block copolymer, and about 10 to 30 weight percent polychloroprene, based on total weight of polymer.

14. The cured polymer blend according to claim 13 wherein said conjugated diene/monovinylarene rubbery block copolymer is characterized by a structure represented by A-B-A or (AB-)$_n$Y wherein A represents a block of polymerized monovinylarene monomer, B a block of polymerized conjugated diene monomer, and Y a residual unit of a polyfunctional coupling agent or polyfunctional initiator, and n is an integer of 2 to 6 inclusive.

15. The cured polymer blend according to claim 14 wherein said conjugated diene contains 4 to 8 carbon atoms per molecule, and said monovinylarene contains 8 to 12 carbon atoms per molecule.

16. The cured polymer blend according to claim 15 containing about 30 to 50 weight percent substantially crystalline polypropylene, about 30 to 50 weight percent rubbery block copolymer, and about 75 to 25 weight percent polychloroprene, based on weights of polymers.

17. The cured polymer blend according to claim 16 wherein said conjugated diene is butadiene, and said monovinylarene is styrene.

18. The cured polymer blend according to claim 17 employing a 70/30 butadiene/styrene rubbery block copolymer, a substantially crystalline polypropylene homopolymer having a nominal melt flow of about 12, a polychloroprene having an ML-4 of about 37-61, wherein the polychloroprene component was cured in situ after blending the polymers with a zinc dibutyldithiocarbamate, zinc oxide, magnesium oxide curing system.

19. A molded article of the cured blend of claim 10.

20. A molded article of the cured blend of claim 18.

* * * * *